United States Patent Office

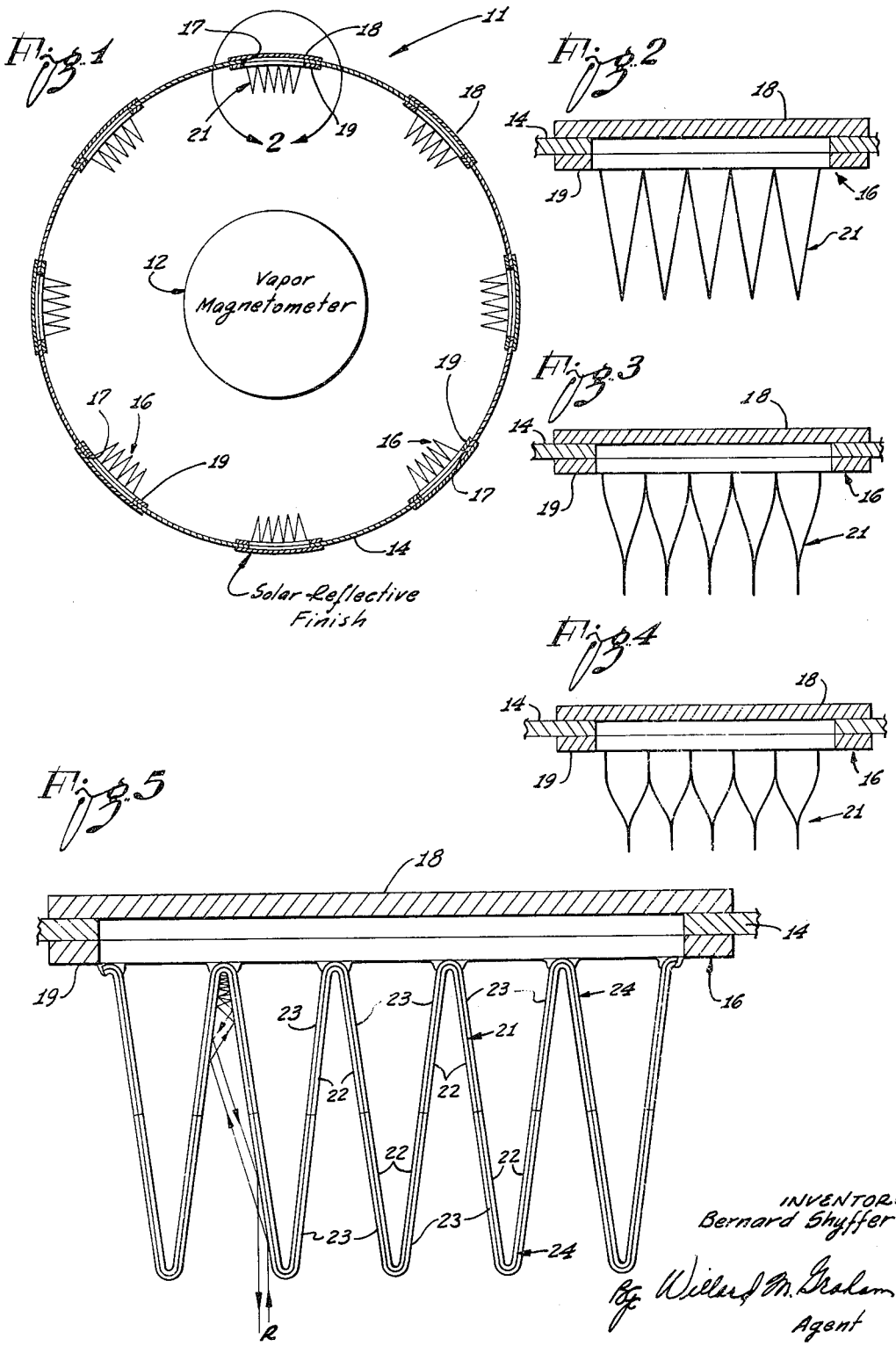

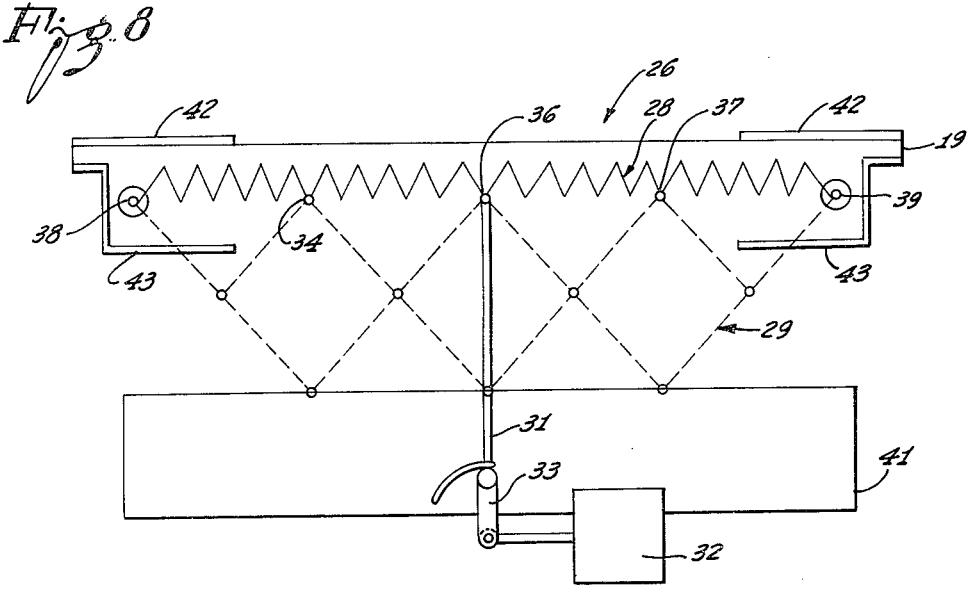

3,205,937
Patented Sept. 14, 1965

3,205,937
CONTROL OF EFFECTIVE EMISSIVITY
AND ABSORPTIVITY
Bernard Shyffer, Inglewood, Calif., assignor to Northrop Corporation, Beverly Hills, Calif., a corporation of California
Filed May 28, 1962, Ser. No. 198,031
5 Claims. (Cl. 165—96)

The present invention pertains to heat exchange apparatus and more particularly to radiant heat exchange apparatus including a structure of variable geometry adapted to increase and decrease the effective emissivity and absorptivity of the apparatus.

Frequently the operating temperatures of certain apparatus, equipment and/or components must be maintained within limited ranges if they are to function properly. The problem of maintaining the aforementioned operating temperatures within a prescribed range is further complicated by the environment in which the apparatus etc., is required to operate. In this respect the environment in which apparatus etc. if required to operate may preclude the transfer of heat by convection and conduction, thus if heat transfer occurs, it must be accomplished by radiation only. Although the heat exchange apparatus as disclosed herein is described in connection with a space vehicle operating in a space environment it should be understood that it has other applications and may be utilized in other and similar environments.

It is well known that many factors are present in space which effect the temperature of components mounted in a space vehicle. External factors such as; changes in the solar constant (due to a particular orbit), sun view angle, reflection from planetary bodies, eclipses etc., constitute factors that effect the temperature of components in space. Internal factors effecting the temperatures of components mounted within a space vehicle are—for example, the power levels and duty cycles of components mounted within the vehicle, gradual changes in the optical properties of surfaces of materials (due to space environment) etc. Considering the variable factors listed above, it becomes apparent that an efficient heat exchanger, functioning to maintain the temperature of components mounted within a space craft within predetermined temperature ranges, is needed.

Briefly the present invention includes a surface fabricated of a sheet member of variable geometry and defining a plurality of convolutions or folds. The configuration of the sheet member automatically changes in response to energy available to be radiated therethrough. As the geometry of the sheet member changes the effective emissivity and absorptivity thereof is altered, in other words the ability of the sheet member to emit and/or absorb radiant energy is increased and/or decreased.

The term "effective emissivity and/or absorptivity" as used throughout this specification is defined as the ratios of the energy emitted or absorbed by a surface as viewed from a distance to that emitted or received by a black surface of the same projected area, both surfaces being at the same temperature.

Accordingly it is an object of this invention to provide heat exchange apparatus functioning automatically to maintain the temperature of apparatus, equipment and/or components mounted within the heat exchanger within a predetermined range although internal and external factors acting on the apparatus etc. are continually changing.

Another object is to provide heat exchange apparatus a portion of which is automatically reshapable whereby the effective emissivity and absorptivity of the exchanger is altered.

Another object is to provide a heat exchange facility which is simple in design and construction, which is particularly free of malfunctioning tendencies, which is economical to manufacture and which may be readily adapted to numerous applications.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a diametrical cross-sectional view of one embodiment of the radiant heat exchange facility as disclosed herein.

FIGURE 2 is an enlarged longitudinal sectional view of that portion of the heat exchange facility of FIGURE 1 enclosed within the circular area as indicated by the numeral 2 in the later figure, the convoluted sheet member in this figure being shown in its maximum heat flow position.

FIGURES 3 and 4 are sectional views similar to FIGURE 2 but showing the convoluted sheet member in its equilibrium and minimum heat flow positions, respectively.

FIGURES 5, 6 and 7 are further enlarged views of FIGURES 2, 3 and 4, respectively.

Figure 6:
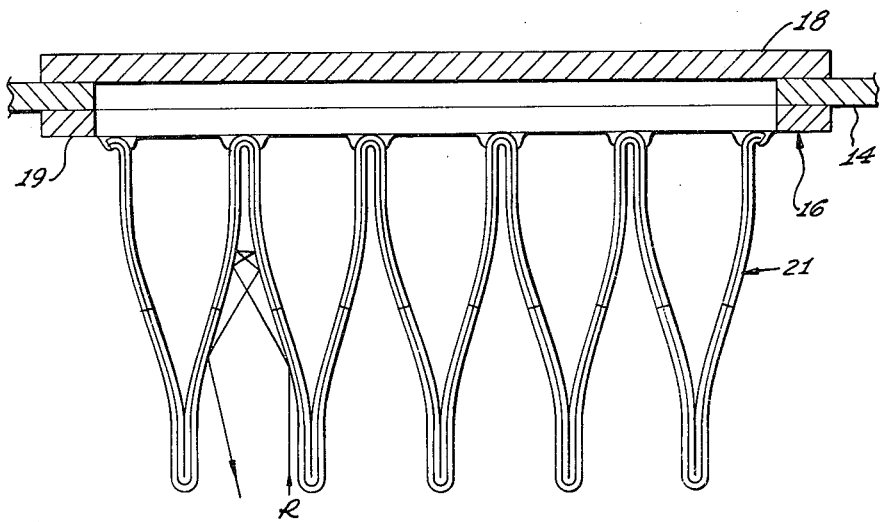

FIGURE 8 constitutes a side elevational view of another embodiment of the heat exchange facility as disclosed herein.

Referring to the drawings for a description of the present invention, FIGURE 1 shows a heat exchange facility 11 as disclosed herein housing a vapor magnetometer 12. The magnetometer houses sensitive instruments and components adapted to measure the magnetic lines of force of planets and the like.

The heat exchange facility 11 and magnetometer 12 are carried into space by a space vehicle, for example—on the boom of a satellite (not shown). As the satellite orbits the earth the facility 11 and magnetometer 12 are periodically subjected to radiation from the sun and also to the shadows of the earth. Under conditions referred to above the aforementioned instruments and components housed in the magnetometer must be maintained within a prescribed temperature range if they are to operate properly. For purposes of illustration, it may be assumed that the temperature of the aforementioned instruments and components must be maintained between thirty and fifty degrees centigrade (30°–50° C.), the desired average temperatures being forty degrees centigrade (40° C.)

Basically the heat exchange facility 11 consists of a spherical shell 14 and heat exchange subassemblies 16. Openings 17 are provided in the wall of the shell which are uniformally spaced over the entire surface thereof. The internal and external surfaces of the shell 14 are coated with a highly reflective material—for example, by a vacuum-deposited aluminum coating or the like. The surfaces are treated in this manner so that the major portion of radiant energy, originating inside and/or outside the facility 11, is caused to pass through the subassemblies 16.

The construction of the sphere 14 is completed by plates 18 having a spherical configuration the inside radius of which is the same as the outside radius of the sphere 14. One of the plates 18 covers each of the openings 17 and has a minimum overlapping relation with the shell 14. The outside surface of the plates 18 are coated with a solar reflective material, a typical solar reflective material which may be used for this purpose is titanium oxide or paint containing this pigment.

Each of the subassemblies 16 include a frame member 19 completely surrounding each opening and a composite metallic sheet member 21. The sheet members 21 constitute a plurality of individual sheets fabricated at a predetermined and constant temperature and, while their temperature is maintained constant, are shaped to provide a convoluted structure as shown in FIGURES 2 and 5. While the temperature of the shaped sheet 21 is maintained at the aforementioned predetermined and constant temperature its ends, also the apices thereof located in the same plane, are secured to the frame member 19 as best seen in FIGURE 5. The subassemblies 16 are then secured to the inside wall of the sphere 14 with a frame member 19 surrounding each of the openings 17. To facilitate the installation of the subassemblies 16 within the sphere 14, also the magnetometer 12, the sphere may be fabricated in hemi-spherical portions and secured together after the above components have been mounted therein.

Figure 7:
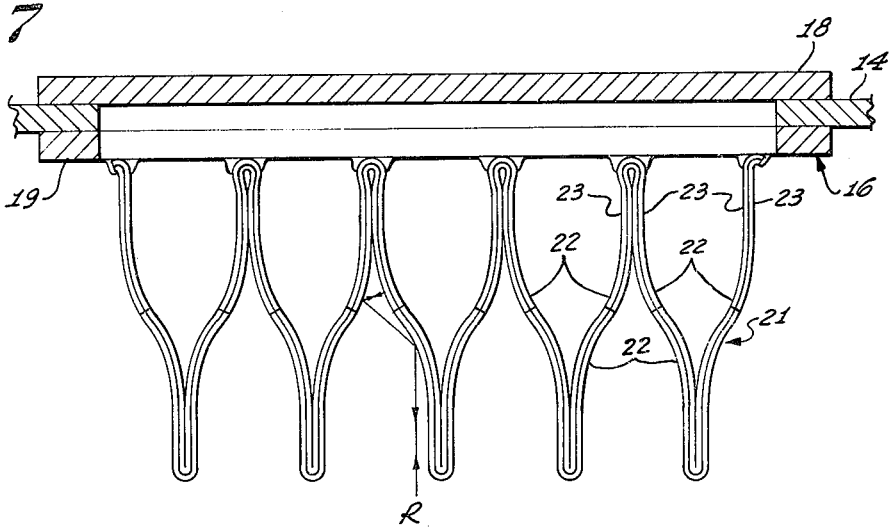

As previously mentioned the composite sheet members 21 are shaped to define a plurality of convolutions as shown in detail in FIGURES 2 and 5. The thickness of the composite sheet member is purposely exaggerated especially in FIGURE 5 for purposes of clarity, in actual practice the sheet members will be much thinner. Each of the convolutions of the members 21 consists of six individual sheets identified by the numerals 22 and 23 having high and low thermal coefficients of expansion, respectively. The sheets 22 and 23 are first secured together in face-to-face relation to provide individual bimetallic sheet members identified by the numeral 24. The members 24 are secured together in end-to-end reversed abutting relation. That is, in fabricating a composite sheet 21 the relation of the individual sheets 22 and 23 are reversed therein so that they alternately become opposite sides of the sheet 21. This type of construction insures that the sheet 21 will assume the configurations shown in FIGURES 5–7 as the temperature thereof is raised or lowered due to the high and low coefficients of expansion of the sheets 22 and 23.

The fabrication (brazing shaping) of the sheet members 21 is effected at the aforementioned predetermined temperature, in the present instance at a temperature of fifty degrees (50°) centigrade corresponding to their straight line or flat configuration and maximum heat flow configuration. Performing this fabrication at this particular temperature insures that the members 21 will not wrinkle or buckle although it is constructed of individual sheets having different coefficients of thermal expansion. Referring to FIGURE 5, it will be seen that the folds of the convolutions occur at locations midway between the abutting juncture of the individual sheet members 24. Both sides of the composite sheet member 21 are then coated with a highly reflective material—for example, a vacuum deposited aluminum coating or the like.

The construction of the facility 11, including the heat-exchange subassemblies 16, having been described, a better understanding thereof will be forthcoming from the following discussion of its operation.

As stated above the facility 11 is designed to maintain the temperature of components mounted therein within a range of 30°–50° C., in fact at a temperature of 40° C. or as nearly therto as possible. Attention is also directed to the fact that the sheet members 21 are fabricated and secured to the frame mebers 19 while their temperature is maintained at fifty degrees centigrade (50° C.). Inasmuch as the components comprising the magnetometer 12 are intended to function at the temperature of 40° C., the sheets 21 inherently assume the configuration as shown in FIGURE 3 due to its bimetallic construction. In other words, the configuration shown in FIGURE 3 constitutes the equilibrium heat flow position of the sheet member 21 and corresponds to the desired operating temperature of the components comprising the magnetometers 12.

Assuming now that the temperature of components comprising the magnetometer 12 become excessively high due to a particularly heavy duty cycle thereof or the like, the sheet 21 automatically assumes the configuration shown in FIGURE 2 or some intermediate configuration between that shown in FIGURE 3 and FIGURE 2. In this new configuration the member 21 radiates more energy from components comprising the magnetometer 12 than the configuration shown in FIGURE 3. Accordingly, the temperature of the subject components are lowered or returned to 40° C. On the other hand, should the temperature of components comprising the magnetometer 12 fall below the desired temperature of 40° C. the sheet 21 will assume the configuration shown in FIGURE 4 or some configuration between that shown in FIGURE 3 and FIGURE 4.

Accordingly it will be seen that the configuration of the sheet member 21 shown in FIGURE 3 corresponds to the desired temperature of 40° C. while the configurations shown in FIGURES 2 and 4 correspond to upper and lower limits of the aforementioned desired temperature range, respectively. The changes in configuration of the sheet member 21 is due to its bimetallic construction and the reversed arrangement of the individual sheets 22 and 23.

Specifically the various configurations of the sheet 21 affect the transfer of radiant energy from the magnetomter 12 in the following manner. Assuming that radiant energy, represented by the solid line R, contacts the sheet 21 at such time as the latter has assumed the shape shown in FIGURE 5. It will be seen that the radiant energy will be repeatedly reflected between the sides of the fairly deep convolutions, thus a greater amount of energy will be absorbed and in turn emitted to space. This is not true in the configuration shown in FIGURES 6 and 7, in these figures less reflection occurs and, therefore, less energy is radiated to space. Thus it will be seen that the most heat flow occurs at such time as the sheet assumes the configuration shown in FIGURE 5 (maximum heat flow position). Less heat flow occurs at such time as the sheet 21 assumes the configuration shown in FIGURE 6 (equilibrium heat flow position) and the smallest amount of heat flow occurs at such time as the member 21 assumes the configuration shown in FIGURE 7 (minimum heat flow position). Thus it will be seen that the configuration of the member 21 is continually changing to maintain the temperature of components mounted within the facility 11 within a predetermined range.

Referring to FIGURE 8, here another embodiment of the heat exchange subassembly 16 is shown. Inasmuch as the latter embodiment, identified in its entirety by the numeral 26, functions similarly, in so far as its heat exchange characteristics are concerned as the subassembly 16 of FIGURE 1, a detailed description pertaining to its heat exchange characteristics is not considered necessary.

In this embodiment the subassembly 26 includes a metallic sheet member 28, two sets of parallelogram linkages 29, an actuating rod 31, a bellows member 32 filled with a thermal-sensitive liquid and cam and crank means 33. The sheet member 28 is of unitary construction and is folded upon itself to provide a plurality of convolutions. The above components are assembled substantially as shown in FIGURE 8 in which the sheet member 28 is in its minimum heat flow position in which its effectiveness as a transfer agent of radiant energy is minimized.

It will be understood that the side surfaces of the sheet member 28 are coated with a highly reflective material, this coating may constitute the same material as that used to coat the side surfaces of the sheet member 21 of the first embodiment.

It will also be noticed that the cross-members 34, 36 and 37, extending between the two linkages 29—29 provide pivoting structure for the linkages 29—29 and also function to support the member 28. The ends of the member 28 are secured to the cross-members 38 and 39. The supporting structure 41 may constitute the shell of the magnetometer 12 or other structure housing components whose temperature is to be controlled.

The subassembly 26 is mounted inside the frames 19 similarly as the subassemblies 16. As mounted it will be noticed that sheet-like members 42 and 43 are provided to shield the outer convolutions of the sheet member 28 from internal and external heat flow as the latter contracts and expands between its maximum and minimum heat flow positions.

It will now be apparent that if the temperature of components mounted within the housing 41 is elevated the bellows member 32 will expand, the cam and crank means 33 are rotated in a clockwise direction and the rod 31 elevated. This movement causes the sheet member 28 to contract which movement increases the depth of the convolutions and, for reasons previously explained an increase in radiation through the sheet 28 is affected. The relation of the sheet member 28 just described corresponds to that shown in FIGURE 3 described in connection with the first embodiment. In other words the position of the sheet member 28 as just described is its equilibrium heat flow position corresponding to the desired temperature of 40° C.

Assuming now that the temperature of components in the structure 41 is increased further. The bellows member 32 is further expanded, this movement is transmitted to the member 28 through the cam means 33 and rod 31 causing the depth of the convolutions to be further increased and the member 28 to assume its maximum heat flow position. Accordingly a greater amount of energy will be radiated by the sheet 28 allowing the temperature of the aforementioned components to fall or return to their optimum operating temperature of forty degrees centigrade (40° C.).

In view of the above discussion, it will be apparent that the change in configuration of the convolutions of the sheet 28 in being transformed between their minimum and maximum heat flow positions, is effected in a different manner from that described in connection with the sheet 21 of the first embodiment. However, as the sheet 28 is transformed from its minimum heat flow position (FIGURE 8) to its maximum heat flow position (not shown) it will be apparent that the depth of the convolutions will be increased and the distance therebetween decreased, accordingly the flow of heat through the sheet 28 will be greater in the latter position for reasons previously discussed in connection with the first embodiment.

While in order to comply with the statute, the invention has been described in language more or less specific as to structural features, it is to be understood that the invention is not limited to the specific features shown, but that the method and means disclosed comprise several forms of putting the invention into effect, and the invention is therefore claimed in any of its forms or modifications whithin the legitimate and valid scope of the appended claims.

What is claimed is:

1. Heat exchange apparatus comprising: a housing having at least one opening in a wall thereof; metallic sheet means including a plurality of sections; each of said sections including a pair of individual sheet members having high and low coefficients of thermal expansion, respectively; said individual sheet members being secured together in end-to-end abutting relation to provide a composite sheet; said composite sheet being folded on itself to provide a plurality of convolutions; said composite sheet being secured to said housing and covering said opening and functioning to alter the effective emissivity and absorptivity of said heat exchange apparatus.

2. Heat exchange apparatus as set forth in claim 1: in which said individual sheet members having high coefficients of thermal expansion are alternately located on opposite sides of said composite sheet with respect to said individual sheet members having low coefficients of thermal expansion.

3. Heat exhange apparatus comprising: a housing having at least one opening in a wall thereof; metallic sheet means including a plurality of sections; each of said sections including a pair of individual sheet members having high and low coefficients of thermal expansion, respectively; said individual sheet members being secured together in end-to-end abutting relation to provide a composite sheet; said composite sheet being folded on itself a plurality of times to provide a plurality of V-shaped convolutions; said composite sheet being secured to said housing and covering said opening and in which the configuration of said convolutions are altered in response to a temperature differential between the inside and outside of said heat exchange apparatus.

4. Heat exchange apparatus as set forth in claim 3: in which said individual sheet members having high coefficients of thermal expansion are alternately located on opposite sides of said composite sheet with respect to said individual sheet members having low coefficients of thermal expansion.

5. Heat exchange apparatus comprising: a plurality of individual sheet members having side surfaces and a high coefficient of thermal expansion; a plurality of individual sheet members having side surfaces and a low coefficient of thermal expansion; said individual sheet members having high and low coefficients of expansion being secured together in side surface contacting relation to provide a plurality of sections; said sections being secured together in end-to-end abutting relation to provide a composite sheet; said composite sheet being further characterized in that the respective sides thereof constitute alternately an individual sheet member having a high coefficient of expansion and an individual sheet member having a low coefficient of expansion; said composite sheet being folded on itself a plurality of times to provide a plurality of V-shaped convolutions; a housing having at least one opening in a wall thereof; and said composite sheet being secured to said housing to completely cover said opening and presenting a predetermined area to radiant energy heat rays entering or leaving said heat exchange apparatus at such time a predetermined temperature differential is present across said composite sheet and a less and greater area than said predetermined area at times as the temperature differential is less and greater, respectively, than said predetermined temperature differential.

References Cited by the Examiner

UNITED STATES PATENTS

| 2,314,412 | 3/43 | Matthews | 73—363.5 |
| 2,336,408 | 12/43 | Matthews | 73—363.5 X |
| 2,561,217 | 7/51 | Muir | 73—363.5 X |
| 2,949,283 | 8/60 | Smith | 165—96 X |
| 2,998,962 | 9/61 | Heyn | 165—81 |
| 3,024,941 | 3/62 | Vandenberg | 165—133 X |
| 3,048,375 | 8/62 | Walker | 165— 96 X |

FOREIGN PATENTS 619,224  5/61  Canada.

CHARLES SUKALO, *Primary Examiner.*